June 28, 1966    J. PAYMAL    3,258,351
PROCESS FOR TREATING GLASS TO PRODUCE REVERSE
STRESSES, AND PRODUCT
Filed Jan. 9, 1961

INVENTOR
JEAN PAYMAL
BY Bauer and Seymour
ATTORNEYS

United States Patent Office 3,258,351
Patented June 28, 1966

3,258,351
PROCESS FOR TREATING GLASS TO PRODUCE REVERSE STRESSES, AND PRODUCT
Jean Paymal, Neuilly-sur-Seine, France, assignor to Compagnie de Saint-Gobain, Neuilly-sur-Seine, France
Filed Jan. 9, 1961, Ser. No. 81,471
Claims priority, application France, Jan. 8, 1960, 815,143
13 Claims. (Cl. 106—54)

The present invention relates to a process for treating glass to produce modifications of properties by an exposure to corpulscular radiation.

It is already known that an exposure to corpuscular radiation will produce in materials modifications which may involve notable dimensional variations. If these variations are, at every moment, uniform at every point of an object, they will not generate any stress in that object. On the contrary, if the variations are heterogeneous, they will generate a system of stresses affecting the whole object. For instance, if the irradiation produces an expansion of a material such as glass in the superficial layers of an article but does not affect the internal zone, and if the material, at the same time, remains a solid, unable to flow, the external layers which tend to expand are hindered in their expansion by the internal zone, unaffected by expansion, are compressed while the internal zone is put under tension.

In the inverse case where irradiation produces a contraction of the glass instead of an expansion, which might also be considered as a negative expansion, the external layers are put under tension and the internal zone under compression.

In both cases a system of stresses is established in which the compressions and expansions are balanced. Hereafter the term "expansion" will be used in its broader meaning to include positive expansion (proper expansion) and negative expansion (contraction).

The present invention relates to a process for obtaining a determined system of stresses. This process consists:

In making the article from a glass the expansion (positive or negative) of which increases under the action of corpuscular radiations until it reaches a maximum corresponding to an exposure dose D, then ceases to increase for superior doses.

In exposing this article with a dose of corpuscular radiations equal or superior to D in the external layers of the article and inferior to D in the internal zone.

Under these conditions, the stress (compression if the expansion is positive, tension if the expansion is negative) has a substantially uniform value in the external layers of the article through a given depth corresponding to a dose almost equal to D.

The corpuscular radiations which can be used are accelerated particles, or else particles generated by nuclear reactions such as protons, deuterons, tritons, alpha particles, nucleons of lithium or of other elements.

The manner in which the differential effects are obtained depends upon the nature of the chosen radiations.

In the embodiment hereinafter described in detail, nuclear reactions occurring inside the article itself are used. For this purpose glasses containing in their composition a fissible element are used, for instance, boron, whose natural form contains 18.8% of isotope 10, which gives the following reaction ($n$, alpha):

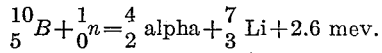

Under the action of a thermal neutron, boron-10 disintegrates, giving birth to a helium nucleon and a lithium nucleon. Both these nucleons are projected with a great speed among the atoms of the material, and, as a result, displace some of the atoms encountered. The result is an elongation either positive or negative which is, for a given glass, related to the number of reactions started per unit of volume or "density of reactions," that is, to the neutron flux at the considered point.

This elongation increases with the reaction ($n$, alpha) density until this reaction density reaches some value corresponding to the irradiation dose D which causes the maximum elongation and then remains substantially constant thereafter. The neutron flux bathing the article is not uniform at all points through the mass of the article because of the capture of neutrons by the different elements of the glass and in particular by the boron-10.

As a result the reaction ($n$, alpha) density is less important in the internal zone than in the external layers, and accordingly the elongation of the glass, related to this reaction ($n$, alpha) density, is not uniform in the irradiated article.

The external layers of the article receive more neutrons than the subjacent layers. Accordingly, as long as the irradiation dose remains inferior to the D value, a system of stresses is generated which has a parabolic aspect. When the external layers have been exposed in such a manner that the irradiation dose is superior to the D value, they do not undergo further elongation. Throughout a certain depth an unvarying effect is obtained. If the irradiation was continued long enough to expose the inner zone until it received an irradiation dose D, the elongation would become the same at every point throughout the article and all stresses would disappear.

The process according to the invention consists in exposing an object to irradiation in such a way that an external layer having a determined thickness receives an irradiation dose equal or superior to the D value, while the internal zone of the object is exposed to an irradiation dose inferior to D.

The process according to the invention is illustrated in the accompanying drawings.

Figure 1:
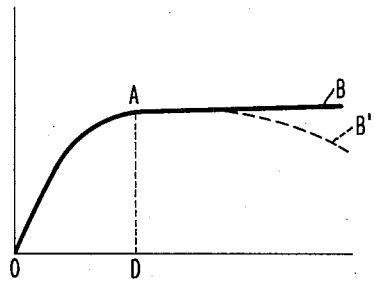
FIGURE 1 is a graphical representation of the free elongation of a glass in terms of the irradiation dose, the dose being measured on the ordinate.

FIGURE 1 shows the total elongation of a glass, for instance the linear elongation, in terms of the irradiation dose to which the glass has been exposed. It can be seen that the elongation increases with that dose until it reaches a given value corresponding to the irradiation dose D (at point A) then remains substantially constant thereafter (along line AB) or, in some cases, abates along the dotted curve AB'.

Figure 2:
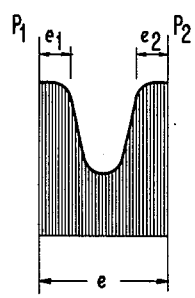
FIGURE 2 is a graphical representation of theoretical elongations which would be obtained in one embodiment of the invention.

FIGURE 2 shows the elongation at different points of a glass object of thickness $e$, shown in cross-section, limited by planes P1 and P2 perpendicular to the section plane, assuming unhindered elongation, where the glass object has been exposed on both faces P1 and P2 to an irradiation superior to D for the external layers and inferior to D for the internal zone. The elongation is uniform throughout the superficial layers $e1$ and $e2$ where the irradiation has been superior to D, according to part AB of the curve of FIGURE 1.

Figure 3:
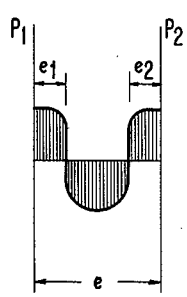
FIGURE 3 is a graphical representation of the stress distribution throughout the thickness of the article of FIGURE 2.

FIGURE 3 shows the stresses which are established in that same glass article owing to the fact that the article is actually coherent and that therefore the elongations cannot take place freely.

The characteristic of this distribution of the stresses according to the invention resides in the fact that the stresses have a substantially constant value for a determined depth $e1$ and $e2$ (measured from the surface).

The irradiation rate which must be used varies inversely to the boron content. It has been found that the dose values D are nearly the same for a great number of glasses having the same boron content, for instance, the following values can be given:

$1.4 \cdot 10^{18} n/cm.^2$ for a glass containing 3% $B_2O_3$.
$0.7 \cdot 10^{18} n/cm.^2$ for a glass containing 10% $B_2O_3$.
$0.4 \cdot 10^{18} n/cm.^2$ for a glass containing 20% $B_2O_3$.
(the boric anhydride percentages are mole percents).

Lithium atoms also give reactions ($n$, alpha) with thermal neutrons but the cross-section of this reaction is one tenth that of boron. For this reason the action of lithium can usually be neglected. For important lithium contents, 10% of $Li_2O$ can be considered as equivalent to 1% $B_2O_3$ (moles percent).

The dose D must be obtained through the mass of the article at a depth corresponding to the desired thickness of equistressed layer. The surface of the article must then be exposed to a higher dose. For articles having some special shape this dose could be calculated. But it is usually simpler to proceed experimentally and to expose the object to increasing doses starting from the doses indicated herein above, until the desired result has been achieved. It is thus possible to eliminate disturbances inherent to the dimensional factors which might modify the law of free elongation obtained for very small samples.

Allowance must be made for the disturbances of the ambient flux because of the presence of the material of the articles. Materials absorb more or less of the neutrons and can abate, in an important proportion, the preexisting neutronic flux. It is convenient in applications where the doses at precise points of the article are unknown, to refer to a neutron "nominal dose" corresponding to the product of the length of exposure by the flux of thermal neutrons existing in the exposure channel in the absence of the article. To obtain a desired result, "nominal doses" will have to be the stronger as the exposed article captures a greater number of neutrons. The coefficient of increase which must be foreseen may vary from 1 to 3, or even more if the article contains an important proportion of absorbing elements.

Glasses presenting a positive elongation, that is glasses capable of being the seat of compression stresses in their superficial layers under the action of corpuscular radiations, are rich in alkaline elements, alkaline earths or lead and have the following molecular composition:

| | |
|---|---|
| $SiO_2$ | Between 10 and 70%. |
| $Al_2O_3$ | Between 0 and 20%. |
| $B_2O_3$ | Between 0 and 50%. |
| $Li_2O+Na_2O+K_2O$ | Between 0 and 30%. |
| $MgO+CaO+SrO+BaO$ | Between 0 and 30%. |
| PbO | Between 0 and 85%. | with the following conditions:

| | |
|---|---|
| $SiO_2+B_2O_3+Al_2O_3$ | Less than 70%. |
| $M_2O+MO+PbO$ | More than 15%. |
| $B_2O_3$ more than 1% or $Li_2O$ | More than 10%. |

$M_2$ represents $Li_2$, $Na_2$, $K_2$, $Rh_2$, $Cs_2$.
M represents Mg, Ca, Sr, Ba.

Glasses presenting a negative elongation, that is glasses capable of being the seat of tension stresses in their superficial layers under the action of corpuscular radiation are rich in glass-forming oxides and have the following molecular composition:

| | |
|---|---|
| $SiO_2$ | Between 50 and 99%. |
| $Al_2O_3$ | Between 0 and 20%. |
| $B_2O_3$ | Between 0 and 80%. |
| $Li_2O+Na_2O+K_2O$ | Between 0 and 20%. |
| $MgO+CaO+SrO+BaO$ | Between 0 and 30%. |
| PbO | Between 0 and 20%. | with the following conditions:

| | |
|---|---|
| $SiO_2+Al_2O_3+B_2O_3$ | More than 75%. |
| $M_2O+MO+PbO$ | Between 0 and 25%. |
| $B_2O_2$ more than 1% or $Li_2O$ | More than 10%. |

$M_2$ and M representing the same metals as here above.

It will be understood that we do not intend to limit our invention to the above cited elements; the process according to the invention could be applied to glasses containing other elements such as beryllium, vanadium, uranium, thorium, etc. The determination of the proportions of each of the oxides which classify the glass in the category of either a positive or a negative elongation, remains unchanged. These elements will be added in the category to which they belong, either to the glass forming oxides ($SiO_2+B_2O_3+Al_2O_2+...$) or to the modifying oxides ($M_2O$, MO, ...).

Boron enriched by boron-10 can be used instead of natural boron so that a stronger gradient of irradiation effect is obtained within the article. Or if a glass containing little boric anhydride is to be used, lithium enriched in lithium-6 can also be used. Moreover, elements having important capture cross-section but which do not undergo fissions, such as cadmium, can be introduced into the glass composition to obtain strong gradients while limiting the thermal effect.

The influence of fast neutrons can usually be neglected as long as the flux of thermal neutrons remains important in comparison with the flux of fast neutrons.

When the flux of fast neutrons superposed on the flux of thermal neutrons becomes important, the heterogeneity of the radiation effects is lessened especially in glasses presenting a low density of fission reactions.

The present invention has also for its object new industrial glass products having in thickness a stress distribution such that it is substantially uniformly stressed throughout a determined depth measured from the surface.

FIGURES 4, 5, 6 and 7 represent sections of glass articles and show the distribution of the stresses throughout the thickness of these articles after they have been subjected to a corpuscular radiation.

Figure 4:
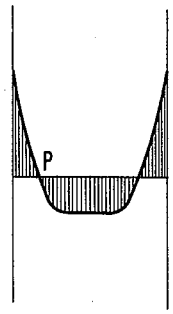
FIGURE 4 is a graphical representation of the stress distribution obtained in a glass article by another treatment.

The glass articles of FIGURE 4 has a positive elongation coefficient and has been exposed to an irradiation inferior to dose D. The process according to the invention has not been applied here. The distribution of the stresses has a generally parabolic aspect.

Figures 5, 6:
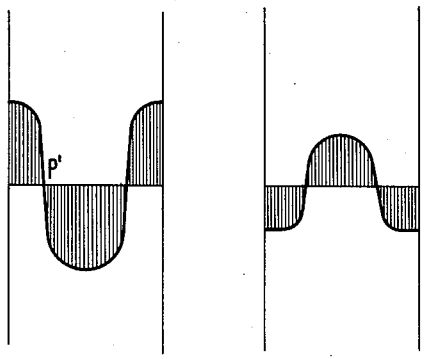
FIGURES 5, 6 and 7 are graphical representations of different stress distributions which can be produced in glass products by the treatment according to the invention, as observed by polarized light in a Babinet compensator.

On FIGURE 5 the same article is shown (which has a positive elongation coefficient) but this article has been exposed through a given thickness of the superficial layers to an irradiation superior to dose D according to the part AB of the curve of FIGURE 1.

The glass article shown in section on FIGURE 6 has a negative elongation coefficient and has been exposed through a given thickness of the superficial layers to an irradiation dose superior to D, according to part AB of FIGURE 1.

Figure 7:
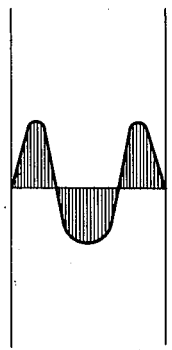

The glass article shown on FIGURE 7 has a positive elongation coefficient but the expansion, increasing until dose D is reached, begins to decrease thereafter (part AB' of the curve of FIGURE 1). The article has been exposed to an irradiation superior to D throughout a certain thickness of the superficial layers.

*Example 1.*—A small glass plate 5 mm. thick having the following molar composition:

| | |
|---|---|
| $SiO_2$ | 47 |
| $B_2O_3$ | 20 |
| PbO | 9.5 |
| $Li_2O$ | 23.5 | exposed to less than $3.10^{17}$ n/cm.$^2$ shows such a distribution of stresses of parabolic shape that point P at which the stresses are null is found at a depth of 0.8 mm. (FIGURE 4). Because of the glass composition the superficial stresses are compression stresses and the stresses in the central zone are extension stresses. The exposure corresponds to a dose less than D at all points of the object. When the dose is slightly raised, point P moves down from the surface, the stresses increase but remain of a parabolic shape. On the contrary if a nominal dose of $1.8 \cdot 10^{18}$ n/cm.$^2$ is reached, the shape of the stress distribution is changed: substantially constant compression stresses are obtained along a thickness of 0.4 mm. with an intensity of 200 mmu/cm., that is about 110 kg./cm.$^2$. The point P′ where stresses are null can be found at 1.25 mm. under the surface, that is at half of the half-thickness (FIGURE 5).

*Example 2.*—A small glass plate having the following molar composition:

| | |
|---|---|
| $SiO_2$ | 80 |
| $B_2O_3$ | 4.3 |
| $K_2O$ | 1.0 |
| $Na_2O$ | 14.7 |

5 mm. thick, exposed to $1.4 \cdot 10^{18}$ n/cm.$^2$ shows a zone of unvarying tension along a depth of 0.9 mm., that is of more than a third of the half-thickness of the object (FIGURE 6).

It must be noticed that for important doses, or for glasses presenting an important dimensional evolution, the stresses can disappear because of a preferential rearrangement of the material tending to release the strains. This explains why the values of the strains achieved are usually less than should result from the differences in specific weight between the different zones of the object. Of course if tempered glass is treated by the process according to the invention, the preexisting stresses will be modified by the treatment.

What is claimed is:

1. A process for treating homogeneous glass to produce compression stresses of substantially equal value to a selected depth below a surface of the glass and an abrupt change at such depth to tension stresses, which comprises subjecting glass which undergoes volume variation under bombardment by corpuscular radiation to a dosage of corpuscular radiation which, at the surface of the glass, is superior to that dosage D which produces maximum volume variation in the glass, and applying said dosage until the maximum volume variation in the glass is produced to the selected depth and the glass adjacent to but beyond such depth is subjected to impregnation by a dosage of corpuscular radiation inferior to said dose D.

2. A process according to claim 1 which comprises exposing a glass article of said type containing a fissible element to such irradiation by thermal neutrons and thereby generating corpuscular radiation in situ.

3. A process for treating glass to impose a system of stresses varying through its thickness which consists in exposing an article made of a glass which contains a fissible element and which when it is exposed to corpuscular radiation that causes fission of the fissible element undergoes volume variations that increase with the radiation dose until the dose reaches a maximum and ceases to increase thereafter, to a flux of heavy particle corpuscular radiation which reacts with said fissible element, the flux being continued in outer layers until the irradiation dose is superior to the dose D corresponding to the maximum volume variation of the glass, and being limited in interior layers to a dose less than said dose D.

4. A process for treating silicate glass containing fissible material from the group consisting of at least 1 molar percent $B_2O_3$ and at least 10 molar percent $Li_2O$ to cause varying stresses to be developed through its thickness, consisting in exposing an article made of the glass, which undergoes volume variations, when it is exposed to corpuscular radiation, that increases with the radiation dose until it reaches a maximum and ceases to increase thereafter, to a flux of thermal neutrons in outer layers until the irradiation dose is superior to the dose D corresponding to the maximum volume variation of the glass and to a flux in inner layers inferior to said dose D.

5. A process for treating silicate glass containing fissible material from the group consisting of at least 1 molar percent $B_2O_3$ and at least 10 molar percent $Li_2O$ for causing a system of varying stresses to be developed through its thickness, consisting in exposing outer layers of an article made of the glass, which undergoes volume variations, when it is exposed to corpuscular radiation, that increases with the radiation dose until it reaches a maximum and ceases to increase thereafter, to a flux of thermal neutrons until the irradiation dose is superior to the dose D corresponding to the maximum volume variation, and inner layers to a dose inferior to said dose D.

6. A process according to claim 1 in which the glass contains boron enriched in boron-10.

7. A process according to claim 1 in which the glass contains lithium enriched in lithium-6.

8. A process according to claim 1 in which the glass contains at least one element having an important capture cross-section but does not undergo fission.

9. A process according to claim 1 in which the glass has the following molecular composition:

| | |
|---|---|
| $SiO_2$ | Between 10 and 70%. |
| $Al_2O_3$ | Between 0 and 20%. |
| $B_2O_3$ | Between 1 and 50%. |
| $Li_2O+Na_2O+K_2O$ | Between 0 and 30%. |
| $MgO+CaO+SrO+BaO$ | Between 0 and 30%. |
| PbO | Between 0 and 85%. | with the following conditions:

| | |
|---|---|
| $SiO_2+B_2O_3+Al_2O_3$ | Less than 70%. |
| $M_2O+MO+PbO$ | More than 15%. |

$M_2$ represents $Li_2$, $Na_2$, $K_2$, $Rh_2$, $Cs_2$
M represents Mg, Ca, Sr, Ba in which the $B_2O_3$ may be replaced by $Li_2O$ in the amount of about 10% $Li_2O$ for each 1% of $B_2O_3$.

10. A process according to claim 1 in which the glass has the following molar composition:

| | |
|---|---|
| $SiO_2$ | Between 50 and 99%. |
| $Al_2O_3$ | Between 0 and 20%. |
| $B_2O_3$ | Between 1 and 80%. |
| $Li_2O+Na_2O+K_2O$ | Between 0 and 20%. |
| $MgO+CaO+SrO+BaO$ | Between 0 and 30%. |
| PbO | Between 0 and 20%. | with the following conditions:

| | |
|---|---|
| $SiO_2+Al_2O_3+B_2O_3$ | More than 75%. |
| $M_2O+MO+PbO$ | Between 0 and 25%. |

$M_2$ represents $Li_2$, $Na_2$, $K_2$, $Rh_2$, $Cs_2$
M represents Mg, Ca, Sr, Ba in which the $B_2O_3$ may be replaced by $Li_2O$ in the amount of about 10% $Li_2O$ for each 1% of $B_2O_3$.

11. A stressed glass article of homogeneous physical and chemical state throughout its thickness having substantially uniform stresses throughout a determined depth measured from the surfaces of the article and reversed stresses therewithin.

12. A glass article according to claim 11 having compression stresses substantially constant in its surface layers and made of a glass having the following molecular composition:

| | |
|---|---|
| $SiO_2$ | Between 10 and 70%. |
| $Al_2O_3$ | Between 0 and 20%. |
| $B_2O_3$ | Between 1 and 50%. |
| $Li_2O+Na_2O+K_2O$ | Between 0 and 30%. |
| $MgO+CaO+SrO+BaO$ | Between 0 and 30%. |
| $PbO$ | Between 0 and 85%. | with the following conditions:

| | |
|---|---|
| $SiO_2+B_2O_3+Al_2O_3$ | Less than 70%. |
| $M_2O+MO+PbO$ | More than 15%. |

$M_2$ represents $Li_2$, $Na_2$, $K_2$, $Rh_2$, $Cs_2$
M represents Mg, Ca, Sr, Ba in which the $B_2O_3$ may be replaced by $Li_2O$ in the amount of about 10% $Li_2O$ for each 1% of $B_2O_3$.

13. A glass article according to claim 11 having tension stresses substantially constant in its surface layers and made of a glass having the following molecular composition:

| | |
|---|---|
| $SiO_2$ | Between 50 and 99%. |
| $Al_2O_3$ | Between 0 and 20%. |
| $B_2O_3$ | Between 1 and 80%. |
| $Li_2O+Na_2O+K_2O$ | Between 0 and 20%. |
| $MgO+CaO+SrO+BaO$ | Between 0 and 30%. |
| $PbO$ | Between 0 and 20%. | with the following conditions:

| | |
|---|---|
| $SiO_2+Al_2O_3+B_2O_3$ | More than 75%. |
| $M_2O+MO+PbO$ | Between 0 and 25%. |

$M_2$ represents $Li_2$, $Na_2$, $K_2$, $Rh_2$, $Cs_2$
M represents Mg, Ca, Sr, Ba in which the $B_2O_3$ may be replaced by $Li_2O$ in the amount of about 10% $Li_2O$ for each 1% of $B_2O_3$.

References Cited by the Examiner

UNITED STATES PATENTS

| | | | |
|---|---|---|---|
| 2,746,193 | 5/1956 | Billian | 41—41 X |
| 2,928,780 | 3/1960 | Harteck et al. | 204—154 |
| 2,998,675 | 9/1961 | Olcott et al. | 106—39 |
| 3,065,345 | 11/1962 | LeClerc | 250—83.1 |
| 3,107,196 | 10/1963 | Cloque | 65—115 |
| 3,113,009 | 12/1963 | Brown et al. | 106—39 |

OTHER REFERENCES

Ceramic Bulletin, volume 36, No. 9 (1957), "Radiation Effects on Ceramics," pages 372–374.

Nucleonics, volume 14, No. 7 (1956) (pp. 33–35), "What Are Effects of Radiation on Electronic Components."

TOBIAS E. LEVOW, *Primary Examiner*.

ARTHUR P. KENT, *Examiner*.

D. H. SYLVESTER, H. M. McCARTHY, *Assistant Examiners*.